United States Patent
Cho et al.

(10) Patent No.: US 9,549,361 B2
(45) Date of Patent: Jan. 17, 2017

(54) METHOD AND APPARATUS FOR ROUTING PROXIMITY-BASED SERVICE MESSAGE IN WIRELESS COMMUNICATION SYSTEM

(71) Applicant: Samsung Electronics Co., Ltd., Gyeonggi-do (KR)

(72) Inventors: Song-Yean Cho, Seoul (KR); Kyeong-In Jeong, Suwon-si (KR); Young-Kyo Baek, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/242,378

(22) Filed: Apr. 1, 2014

(65) Prior Publication Data
US 2014/0295815 A1  Oct. 2, 2014

(30) Foreign Application Priority Data

Apr. 1, 2013 (KR) ........................ 10-2013-0035354

(51) Int. Cl.
| | |
|---|---|
| *H04W 40/20* | (2009.01) |
| *H04W 12/00* | (2009.01) |
| *H04W 4/00* | (2009.01) |
| *H04W 76/02* | (2009.01) |
| *H04W 12/08* | (2009.01) |

(52) U.S. Cl.
CPC ............ *H04W 40/20* (2013.01); *H04W 12/00* (2013.01); *H04W 4/00* (2013.01); *H04W 12/08* (2013.01); *H04W 76/023* (2013.01)

(58) Field of Classification Search
CPC .... H04W 40/20; H04W 12/08; H04W 76/023; H04W 4/00
See application file for complete search history.

(56) References Cited

U.S. PATENT DOCUMENTS

| | | |
|---|---|---|
| 2005/0188062 A1 | 8/2005 | Li et al. |
| 2006/0014532 A1 | 1/2006 | Seligmann et al. |
| 2007/0141986 A1 | 6/2007 | Kuehnel et al. |
| 2011/0221568 A1* | 9/2011 | Giobbi ............. G06F 19/322 340/5.82 |
| 2012/0179789 A1 | 7/2012 | Griot et al. |

(Continued)

FOREIGN PATENT DOCUMENTS

| | | |
|---|---|---|
| WO | WO 2005/041534 | 5/2005 |
| WO | WO 2010/030515 | 3/2010 |

OTHER PUBLICATIONS

3rd Generation Partnership Project; Technical Specification Group SA; Feasibility Study for Proximity Services (ProSe) (Release 12), 3GPP TR 22.803 V1.0.1, Aug. 2012, 17 pages.

(Continued)

*Primary Examiner* — Chuong A Ngo
(74) *Attorney, Agent, or Firm* — The Farrell Law Firm, P.C.

(57) ABSTRACT

A method and apparatus for routing a message for a Proximity-based Service (ProSe) by a User Equipment (UE) in a wireless communication system is provided. The method includes sending, to a server, an authorization request message requesting authorization for ProSe usage by an application installed in the UE, the authorization request message including an application ID (ID) for identifying the application and a UE ID for identifying the UE; and receiving an authorization response message including a validity time for a ProSe of the application from the server in response to the authorization request message.

16 Claims, 7 Drawing Sheets

(56) References Cited

U.S. PATENT DOCUMENTS

| | | | |
|---|---|---|---|
| 2013/0064138 A1 | 3/2013 | Hakola et al. | |
| 2013/0288668 A1* | 10/2013 | Pragada | H04W 12/06 455/426.1 |
| 2014/0187267 A1* | 7/2014 | Yang | H04L 69/14 455/456.3 |
| 2014/0192739 A1* | 7/2014 | Liao | H04W 8/22 370/329 |

OTHER PUBLICATIONS

Alcatel-Lucent, "Key Issue: Prose Identities and Discovery", S2-130791, SA WG2 Meeting #96, Apr. 8-12, 2013, 13 pages.
European Search Report dated Sep. 22, 2016 issued in counterpart application No. 14779992.8-1870, 10 pages.

* cited by examiner

METHOD AND APPARATUS FOR ROUTING PROXIMITY-BASED SERVICE MESSAGE IN WIRELESS COMMUNICATION SYSTEM

PRIORITY

This application claims priority under 35 U.S.C. §119(a) to Korean Patent Application Serial No. 10-2013-0035354, which was filed in the Korean Intellectual Property Office on Apr. 1, 2013, the entire disclosure of which is incorporated herein by reference.

BACKGROUND OF THE INVENTION

1. Field of the Invention

The present invention relates generally to a method and apparatus for routing a message for a Proximity-based Service (ProSe) in a wireless communication system.

2. Description of the Related Art

With the development of communication devices and communication systems, users of the communication devices require services by which they can easily obtain or share their desired information at any time. Recently, due to the advent of smart phones and tablet Personal Computer (PCs), an environment has been provided, in which users can obtain and share a variety of information through wireless communication.

However, a wireless communication system may not enable users to obtain and share their desired information, without proper communications infrastructure. In addition, it is difficult for the wireless communication system to efficiently provide real-time information, due to system complexity or the time delay.

Accordingly, a Device to Device (D2D) communication service has emerged, which enables terminals (also known as User Equipments (UEs)) to perform communication services with each other through a direct communication link without network entities such as a base station (also known as an evolved Node B (eNB)) in areas in which there is no communications infrastructure.

At present, however, it is not possible to provide various types of D2D communication services since the systematic message routing for performing D2D communication services has not been defined.

The above information is presented as background information only to assist with an understanding of the present invention. No determination has been made, and no assertion is made, as to whether any of the above might be applicable as prior art with regard to the present invention.

SUMMARY OF THE INVENTION

An aspect of the present invention is to address at least the above-mentioned problems and/or disadvantages and to provide at least the advantages described below.

Accordingly, another aspect of the present invention is to provide a method and apparatus for routing a Proximity-based Service (ProSe) message in a wireless communication system.

In accordance with an aspect of the present invention, there is provided a method for routing a message for a ProSe by a UE in a wireless communication system. The method includes sending, to a server, an authorization request message requesting authorization for ProSe usage by an application installed in the UE, the authorization message including an application identity (ID) for identifying the application and a UE ID for identifying the UE; and receiving an authorization response message including a validity time for a ProSe of the application from the server in response to the authorization request message.

In accordance with another aspect of the present invention, there is provided a method for routing a message for a ProSe by a server in a wireless communication system. The method includes receiving, from a UE, an authorization request message requesting authorization for ProSe usage by an application installed in the UE, the authorization message request including an application ID for identifying the application and a UE ID for identifying the UE; and sending an authorization response message including a validity time for a ProSe of the application to the UE in response to the authorization request message.

In accordance with another aspect of the present invention, there is provided a UE for routing a message for a ProSe in a wireless communication system. The UE includes an application unit configured to install an application; and a ProSe manager configured to send, to a server, an authorization request message requesting authorization for ProSe usage by the application, the authorization request message including an application ID for identifying the application and a UE ID for identifying the UE, and to receive an authorization response message including a validity time for a ProSe of the application from the server in response to the authorization request message.

In accordance with another aspect of the present invention, there is provided a server for routing a message for a ProSe in a wireless communication system. The server includes a receiver configured to receive, from a UE, an authorization request message requesting authorization for ProSe usage by an application installed in the UE, the authorization message including an application ID for identifying the application and a UE ID for identifying the UE; and a transmitter configured to send an authorization response message including a validity time for a ProSe of the application to the UE in response to the authorization request message.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE PRESENT INVENTION

The following description with reference to the accompanying drawings is provided to assist in a comprehensive understanding of embodiments of the invention as defined by the claims and their equivalents. It includes various specific details to assist in that understanding but these are to be regarded as merely examples. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In accordance with an embodiment of the present invention, a method and apparatus are provided for routing a message for a ProSe that supports UEs of a wireless communication network to directly exchange data through a data path between the UEs without using infrastructure, such as a backhaul.

Figure 1:
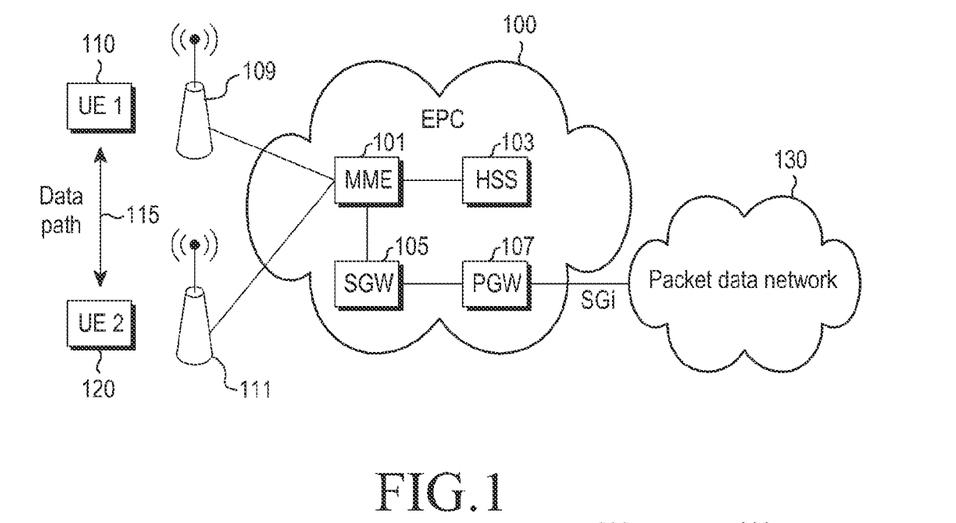
FIG. 1 is a communication diagram illustrating an example of providing a ProSe through a data path between two UEs in a communication system, according to an embodiment of the present invention.

FIG. 1 illustrates an example of providing a ProSe through a data path between two UEs in a communication system according to an embodiment of the present invention. Although an operation of providing a ProSe in a Long Term Evolution (LTE) communication system will be described in conjunction with FIG. 1 by way of example, it will be apparent to those of ordinary skill in the art that the operation of providing a ProSe may be applied to any other communication systems in the same way or with partial modification or deletion thereof.

Referring to FIG. 1, the illustrated LTE communication system includes UEs 110 and 120, an Evolved Packet Core (EPC) 100, a Packet Data Network (PDN) 130, and evolved Node Bs (eNBs) 109 and 111. The EPC 100 includes a Mobile Management Entity (MME) 101, a Home Subscriber Server (HSS) 103, a Serving Gateway (SGW) 105, and a PDN Gateway (PGW) 107. The PGW 107 may be connected to the packet data network 130 via a SGi interface.

The UE1 110 and the UE2 120 represent UEs in which a ProSe is supported (hereinafter referred to as ProSe-supported UEs or simply, ProSe UE), and the UE1 110 or the UE2 120 may perform a procedure for searching for a peer UE that the UE will communicate with, and determining whether there is a need for communication with the searched or found peer UE. Thereafter, upon determining that there is a need for communication with the peer UE, the UE1 110 or the UE2 120 may exchange data through a direct communication link (e.g., a data path 115) between the two UEs.

A description will now be made of an example of the procedure in which the UE1 110 determines whether there is a need for communication with the UE2 120, which is the found peer UE. It will be assumed that the UE1 110 is executing a ProSe application for searching for a taxi located closest to the UE1 110 among the empty taxis capable of going to Seoul. In this case, the UE1 110 may determine whether there is a need for communication with the UE2 120 that is executing a ProSe application, in which the same search conditions (e.g., conditions to search for the nearest taxi among the empty taxis capable of going to Seoul) are set.

In performing the procedure for determining whether there is a need for communication with the UE2 120, the UE1 110 may use radio resources of a wireless communication network. Therefore, as for the above-described procedure, only the UE, which executes a ProSe application authorized by a wireless communication network operator that owns the radio resources, may be authorized to perform the procedure.

Figure 2:
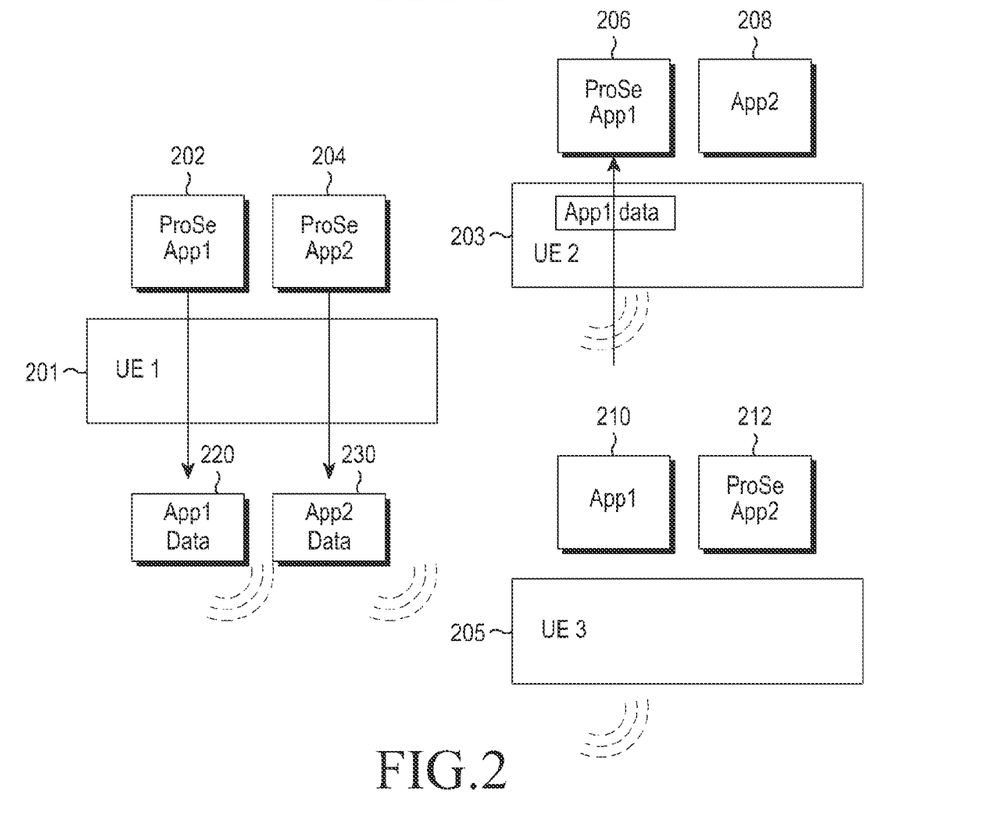
FIG. 2 is a communication diagram illustrating an example in which UEs exchange ProSe application data with each other in a communication system, according to an embodiment of the present invention.

FIG. 2 illustrates an example in which UEs exchange ProSe application data with each other in a communication system according to an embodiment of the present invention.

Referring to FIG. 2, the communication system includes a UE1 201, a UE2 203, and a UE3 205, and it will be assumed herein that the UE1 201 and the UE2 203 are ProSe-supported UEs, and the UE3 205 is a UE in which a ProSe is not supported (hereinafter referred to as a ProSe-unsupported UE). The ProSe-supported UEs refer to UEs which are authorized by a wireless communication network operator to exchange data with each other 20 via a direct communication link between UEs. In addition, it will be assumed that applications App1 202 and App2 204 executed in the UE1 201, an application App1 206 executed in the UE2 203, and an application App2 212 executed in the UE3 205 are ProSe applications capable of ProSe-based data exchange, and an application App2 208 executed in the UE2 203 and an application App1 210 executed in the UE 205 are normal applications incapable of ProSe-based data exchange.

Data App1 data 220 transmitted from the ProSe App1 202 executed in the UE1 201 may be received through the ProSe App1 206 executed in the UE2 203, and may not be received through the App1 210 executed in the UE3 205. In other words, the App1 202 executed in the UE1 201 and the App1 210 executed in the UE3 205 are the same type of application, but the data App1 data 220 transmitted from the ProSe App1 202 may not be received through the normal application App1 210 incapable of ProSe-based data exchange.

Similarly, data App2 data 230 transmitted from the ProSe App2 204 executed in the UE1 201 may not be received through the App2 208 executed in the UE2 203 and the ProSe App2 212 executed in the UE 205. In other words, as for the App2 208, the App2 data 230 may not be received through the App2 208 since the App2 208 is a normal application incapable of ProSe-based data exchange, and as for the ProSe App2 212, the App2 data 230 may not be received through the ProSe App2 212 because the UE3 205 executing the ProSe App2 212 is a ProSe-unsupported UE even though the ProSe App2 212 is a ProSe application capable of ProSe-based data exchange.

In order to transmit the data transmitted from a ProSe application, both of an application for receiving the data and a UE executing the application should be authorized by the wireless communication network operator. That is, the data transmitted from a ProSe application may be executed only in the ProSe-supported UE authorized by the wireless communication network operator and may be received only through the ProSe application capable of ProSe-based data exchange.

Figure 3:
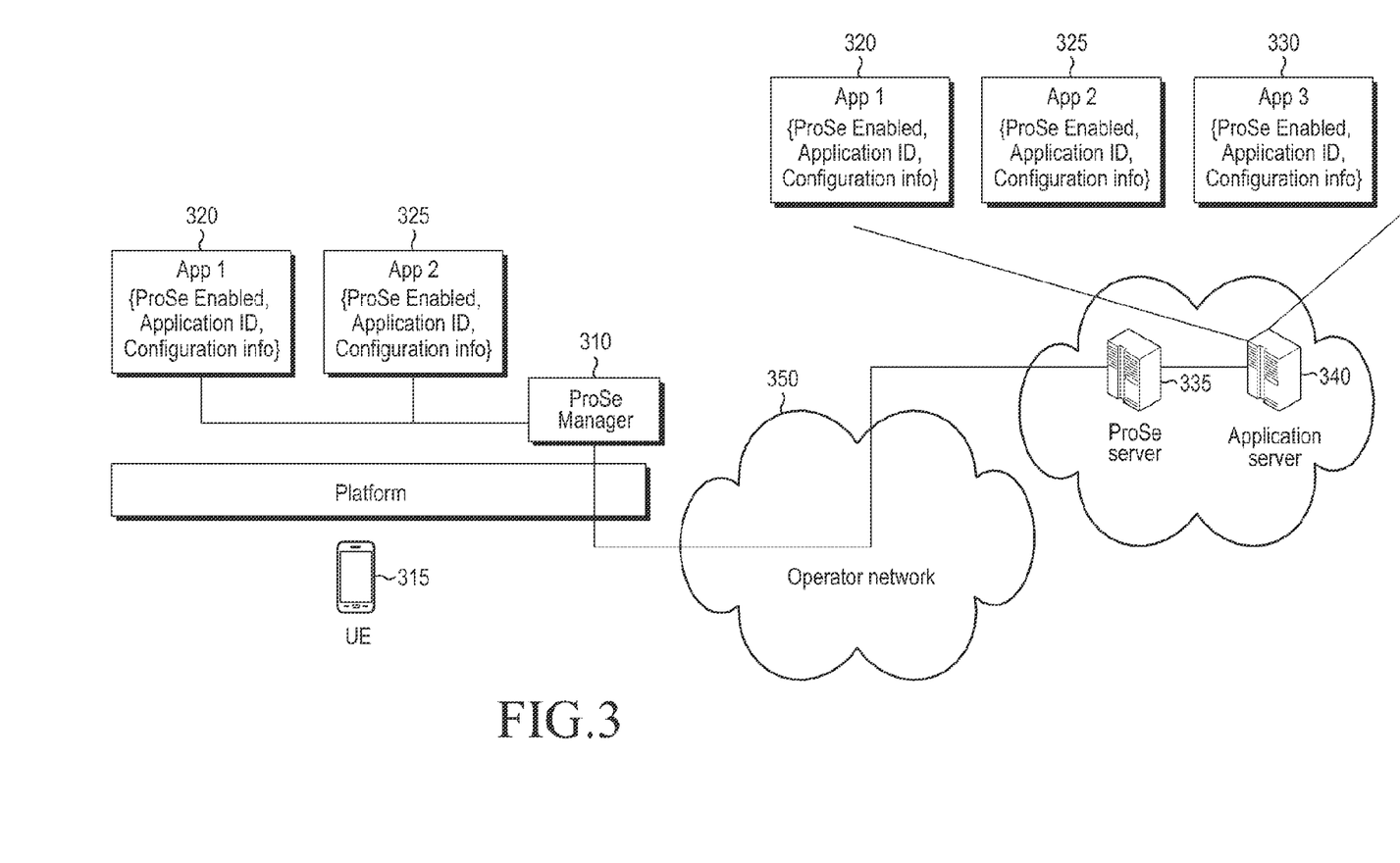
FIG. 3 is a communication diagram illustrating an example in which a user installs a ProSe application in a UE in a communication system, according to an embodiment of the present invention.

FIG. 3 illustrates an example in which a user installs a ProSe application in a UE in a communication system according to an embodiment of the present invention.

Referring to FIG. 3, a UE 315 includes a ProSe manager 310, such that the UE 315 is a ProSe-supported UE.

A user may access an application server 340 operated by an operator using the UE 315, download App1 320 and App2 325 in an application installation package (e.g., App1 320, App2 325, and App3 330), and install the downloaded App1 320 and App2 325 in the UE 315. The application installation package may include a manifest file that is comprised of ProSe enabled' information indicating whether a ProSe is supported, information about an application Identity (ID) assigned by an operator, information about a name of an operator that has assigned the application ID, version/time stamp information of a configuration file, and information about an operator signature for checking the integrity of the configuration file. The manifest file may include other configuration information.

The App1 320 and App2 325, which are installed in the UE 315, may register information related to the use of a ProSe in the information included in the manifest file and in the ProSe manager 310 included in the UE 315. The ProSe manager 310 may access the ProSe server 335 through an operator network 350 and register application-related information in the ProSe server 335 and then may be authorized to use the ProSe. The ProSe server 335 may additionally access the application server 340 and obtain information needed for registration and authorization.

Figure 4:
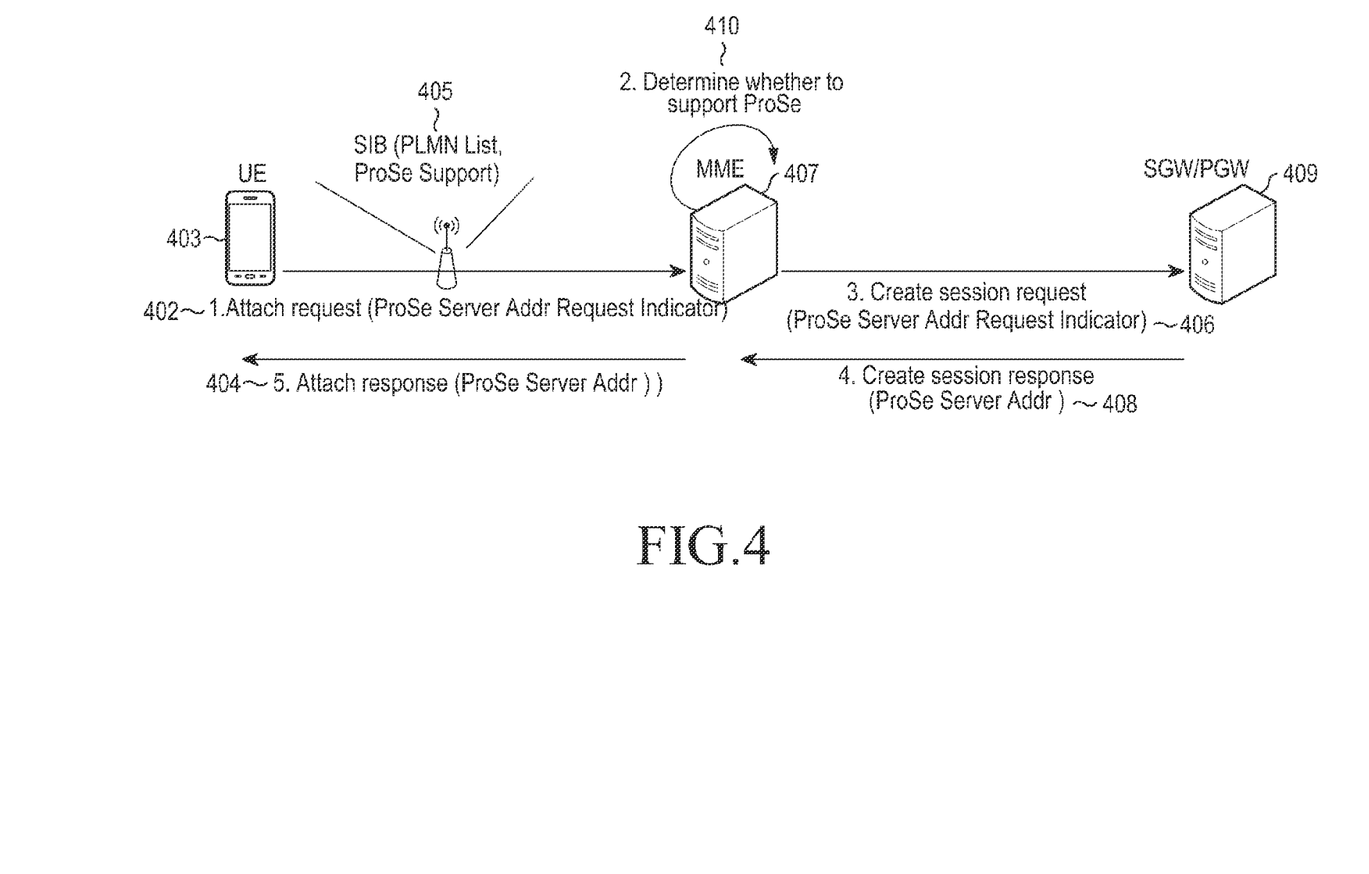
FIG. 4 is a communication diagram illustrating an example of a procedure in which a UE obtains an address of a ProSe server in a communication system, according to an embodiment of the present invention.

FIG. 4 illustrates an example of a procedure in which a UE obtains an address of a ProSe server in a communication system according to an embodiment of the present invention.

Referring to FIG. 4, the communication system includes a UE 403, an eNB 405, a Mobile Management Entity (MME) 407 and a Serving Gateway/Packet Data Network (PDN) Gateway (SGW/PGW) 409. The UE 403 includes a ProSe manager (not shown) and obtains an address of a ProSe server (not shown) at the request of the ProSe manager.

The UE 403 may receive a System Information Block (SIB) broadcasted from the eNB 405 and select an operator supporting a ProSe based on information included in the SIB. The SIB may include a Public Land Mobile Network (PLMN) list in which a network ID of each operator is written and information indicating whether each operator included in the PLMN list supports the ProSe.

At operation 402, the UE 403 sends, to the MME 407, an Attach request message for requesting its registration in the selected operator network. The Attach request message may include a ProSe server address request indicator.

The MME 407 determines, at operation 410, whether the UE 403 supports the ProSe based on subscription information of the UE 403. If the UE 403 is a ProSe-supported UE, the MME 407 sends a Create session request message to the SGW/PGW 409 at operation 406. The Create session request message may include a ProSe server address request indicator.

At operation 408, the SGW/PGW 409 sends a Create session response message to the MME 407 in response to the Create session request message. The Create session response message may include a ProSe server address. At operation 404, the MME 407 sends an Attach response message to the UE 403 in response to the Attach request message. The Attach response message may include a ProSe server address.

The ProSe server address request indicator and ProSe server address transmitted in each of the above-described operations 402, 404, 406 and 409 may be included in related messages as a Protocol Configuration Option (PCO).

Figure 5:
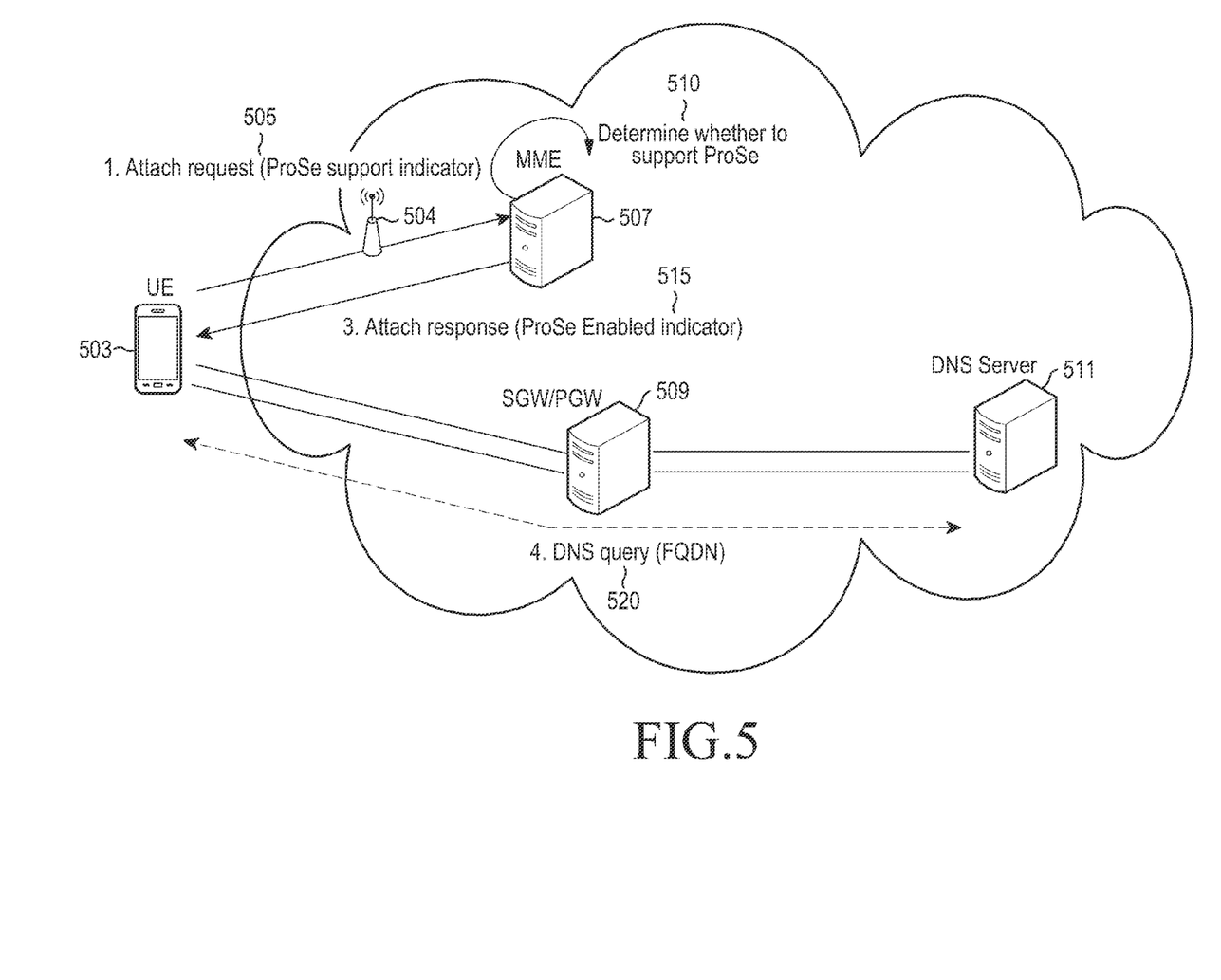
FIG. 5 is a communication diagram illustrating another example of a procedure in which a UE obtains an address of a ProSe server in a communication system, according to an embodiment of the present invention.

FIG. 5 illustrates another example of a procedure in which a UE obtains an address of a ProSe server in a communication system according to an embodiment of the present invention.

Referring to FIG. 5, the communication system includes a UE 503, an eNB 504, an MME 507, an SGW/PGW 509, and a Domain Name System (DNS) server 511. The UE 503 includes a ProSe manager (not shown) and obtains an address of a ProSe server (not shown) at the request of the ProSe manager.

At operation 505, the UE 503 sends, to the MME 507, an Attach request message for requesting its registration in the operator network. The Attach request message may include, for example, a ProSe support indicator indicating that the UE 503 can support a ProSe, as it includes a protocol for ProSe support, a stack and the like.

At operation 510, the MME 507 determines whether to authorize the ProSe for the UE 503. If the MME 507 determines to authorize the ProSe for the UE 503, the MME 507 sends an Attach response message to the UE 503 in response to the Access request message at operation 515. The Attach response message may include a ProSe Enabled indicator indicating that the MME 507 authorizes the ProSe for the UE 503.

At operation 520, upon receiving the ProSe Enabled indicator, the UE 503 performs a DNS query using a Fully Qualified Domain Name (FQDN) of a ProSe management server, which is stored in a Universal Subscriber Identity Module (USIM), thereby obtaining a ProSe server address from the DNS server 511 through the SGW/PGW 509.

Figure 6:
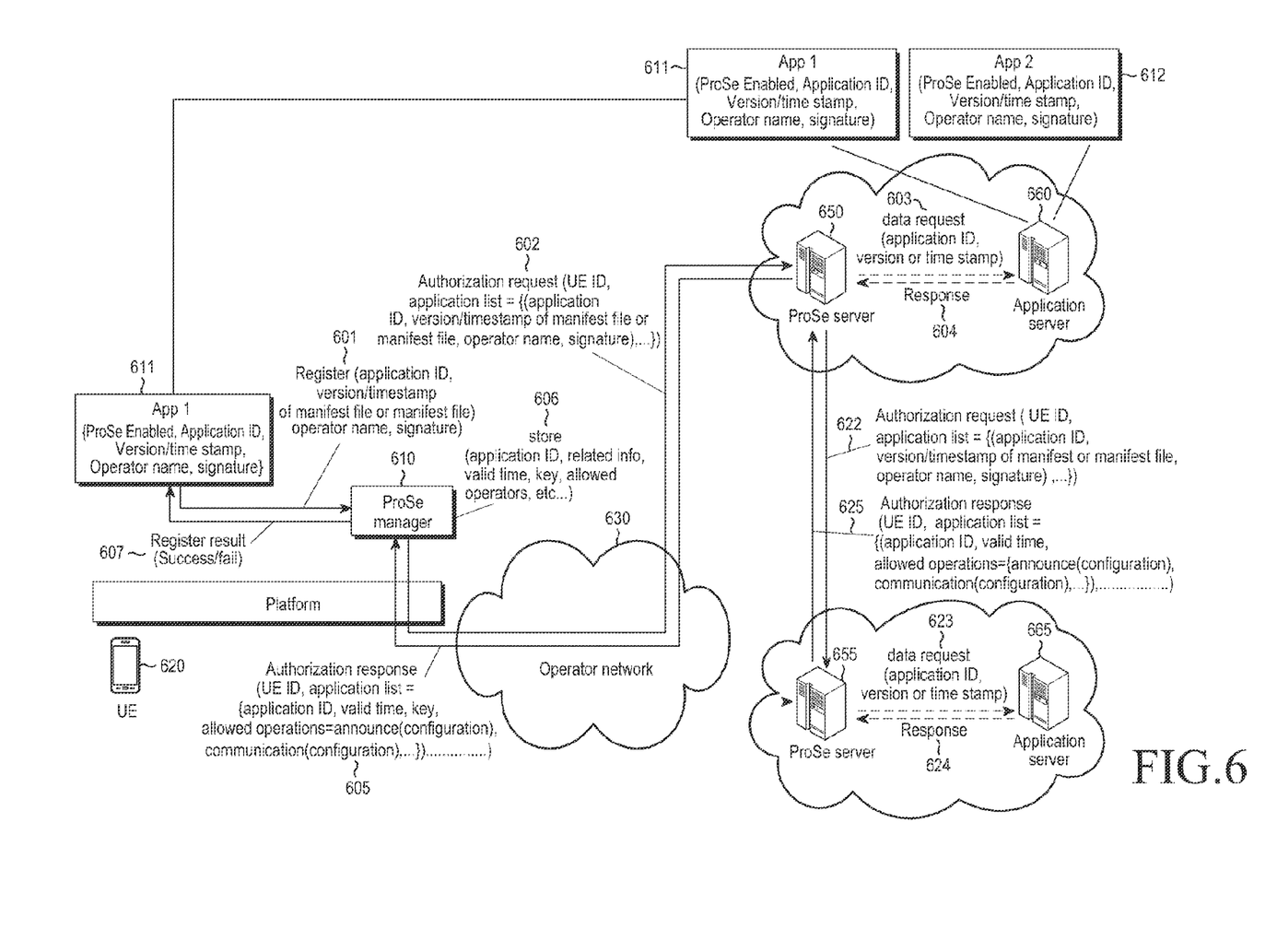
FIG. 6 is a communication diagram illustrating an example in which an application is authorized to use a ProSe in a communication system, according to an embodiment of the present invention.

FIG. 6 illustrates an example in which an application is authorized to use a ProSe in a communication system according to an embodiment of the present invention.

Referring to FIG. 6, an application server 660 operated by an operator may manage an application installation package of App1 611 and App2 612, which includes information about a ProSe. A UE 620 downloads and installs the App1 611. The App1 611 may include a manifest file that is comprised of ProSe enabled' information indicating whether a ProSe is supported, information about an application ID assigned by an operator, information about a name (or ID) of an operator that has assigned the application ID, version/time stamp information of a configuration file, and information about an operator signature for checking the integrity of the configuration file.

An example in which the UE 620 is authorized to use a ProSe through the App1 611 will be described herein below by being divided into Step 1 to Step 5.

Step 1: at operation 601, the UE 620 searches a manifest file included in the App1 611 installed therein and register information related to the user of the ProSe in a ProSe manager 610. The information related to the user of the ProSe may include, for example, an application ID assigned by an operator, a name (or ID) of an operator that has assigned the application ID, version/time stamp information of the manifest file, the manifest file itself, and a signature that the operator that has assigned the application ID has created using the manifest file and an operator's certificate.

Step 2: at operation 602, the ProSe manager 610 determines whether the App1 611 is a registered application, and if the App1 611 is not a registered application, the ProSe manager 610 sends an Authorization request message for requesting authorization for the ProSe usage by the App1 611 to a ProSe server 650 through an operator network 630. The Authorization request message may include information related to the ProSe usage by the App1 611 and a UE ID. The ProSe usage-related information may include, for example, an application ID, an operator name (or ID), version/time stamp information of a manifest file, the manifest file itself, a signature, and the like.

Although it is assumed herein that the App1 611 has one application ID by way of example, the App1 611 may have a plurality of application IDs. If the App1 611 has a plurality of application IDs, multiple application IDs and ProSe usage-related information corresponding to each application ID, which are included in a manifest file, such information may be configured in the form of a list. The configured list will be referred to herein as an application list.

Step 3: The ProSe server 650 determines whether the UE 620 is a ProSe-supported UE in the current network, based on the UE ID, and the ProSe server 650 checks based on information related to the ProSe usage whether the application ID and the operator ID (or name) indicating an operator that has created a signature are the same as an ID of an operator managing the ProSe server 650.

The operator ID indicating an operator that has created a signature is the same as an ID of an operator managing the ProSe server 650, and the ProSe server 650 creates a signature using the certificate of its operator and the manifest file and compares the created signature with a signature included in the ProSe usage-related information received at operation 602. If the signature created by the ProSe server 650 is the same as the signature received at operation 602, the ProSe server 650 determines the App1 611 as a ProSe application capable of ProSe-based data exchange.

If the ProSe usage-related information received at operation 602 includes the version/time stamp information and not the signature, the ProSe server 650 sends a data request message for requesting a manifest file of the App1 611 to the application server 660 at operation 603. The data request message may include the application ID and the version/time stamp information. Thereafter, the ProSe server 650 may receive a response message including a manifest file from the application server 660 and create the signature at operation 604. The created signature may be used to determine whether the App1 611 is a ProSe application capable of ProSe-based data exchange.

However, if the application ID and the operator ID indicating an operator that has created a signature are not the same as the ID of the operator managing the ProSe server 650, the ProSe server 650 accesses a ProSe server 655 that is managed by the operator indicated by the operator name received at operation 602. In this case, the ProSe server 650 may send an Authorization request message for requesting authorization for the ProSe usage by the App1 611 to the Prose server 655 at operation 622. The Authorization request message may include the ProSe usage-related information and the UE ID received at operation 602, and the ProSe usage-related information may include, for example, an application ID, an operator name (or ID), version/time stamp information of a manifest file, the manifest file itself, a signature, and the like.

The ProSe server 655 creates a signature using the certification of its operator and the manifest file and compares the created signature with the signature received at operation 622. If the created signature is the same as the signature received at operation 622, the ProSe server 655 determines the App 611 as a ProSe application capable of ProSe-based data exchange.

If the ProSe usage-related information received at operation 622 includes the version/time stamp information and not the signature, the ProSe server 655 sends a data request message for requesting a manifest file of the App1 611 to an application server 665 at operation 603 at operation 623. The data request message may include the application ID and the version/time stamp information. Thereafter, the ProSe server 655 receives a response message including a manifest file from the application server 665 and creates the signature at operation 624. The created signature may be used to determine whether the App1 611 is a ProSe application capable of ProSe-based data exchange.

At operation 625, the ProSe server 655 sends an Authorization response message to the ProSe server 650 in response to the Authorization request message sent at operation 622. The Authorization response message may include information indicating whether the ProSe usage by the App1 611 is authorized, an application ID, a ProSe delivery time (e.g., validity time information indicating the time in which the ProSe is valid), and information about allowed operators, and the like. The information about allowed operators may include, for example, information about operators available to ProSe, such as announce (which is an example of ProSe) that sends a specific message with specific radio resources. As described above, if the App1 611 has a plurality of application IDs, then multiple application IDs, validity time information corresponding to each application ID, and information about allowed operators, which are included in a manifest file, such information may be configured as an application list.

Upon receiving the Authorization response message at operation 625, the ProSe server 650 modifies the validity time information indicating the time in which the ProSe is valid in accordance with the contract with the operator or the information about allowed operators, in accordance with the policy of the operator operating the ProSe server 650.

Step 4: at operation 605, the ProSe server 650 sends an Authorization response message including information indicating whether the ProSe usage by the App1 611 is authorize, to the ProSe manager 610 of the UE 620. The Authorization response message may include not only the information indicating whether the ProSe usage by the App1 611 is authorized, but also an application ID, a validity time related to the application ID, a key to be used by a related operator, allowed operators, set values for the operators, and the like.

Step 5: at operation 606, the ProSe manager 610 stores the information (e.g., application ID, service-related information, validity time-related information, key-related information, allowed operator-related information and the like) received at operation 605. At operation 607, the ProSe manager 610 transmits information indicating whether the ProSe usage is authorized (i.e., whether authorization for the ProSe is successful or failed) to the UE 620 through the App1 611.

However, if the information indicating whether the ProSe usage is authorized indicates a failure in ProSe authorization, the ProSe manager 610 may not store the information received at operation 605. Thereafter, if an operation request related to the ProSe is received from the App1 611, the ProSe manager 610 rejects the request.

If there is application-related information whose validity time (or ProSe delivery time) has expired at Step 1 to Step 5, the authorization procedure at Step 2 and Step 3 may be re-performed to request update of the validity time.

A UE, which has undergone authorization for the ProSe usage by an application through the authorization procedure set forth in Step 2 and Step 3, may continuously transmit announce data or may transmit announce data only upon request. The announce data may include, for example, an application ID, application-related information, and the like.

The example of transmitting announce data only upon request may correspond to a case in which a ProSe-supported UE boarding a taxi is monitoring wireless resources agreed to send a search message. In other words, if a UE searching for a nearby taxi sends a search message including information such as an ID of an application for searching for a taxi and a destination, using the agreed wireless resources, a ProSe-supported UE boarding a taxi may receive a search message by detecting wireless resources and send the search message to the UE searching for a nearby taxi to notify that there is a user search for a taxi.

Figure 7:
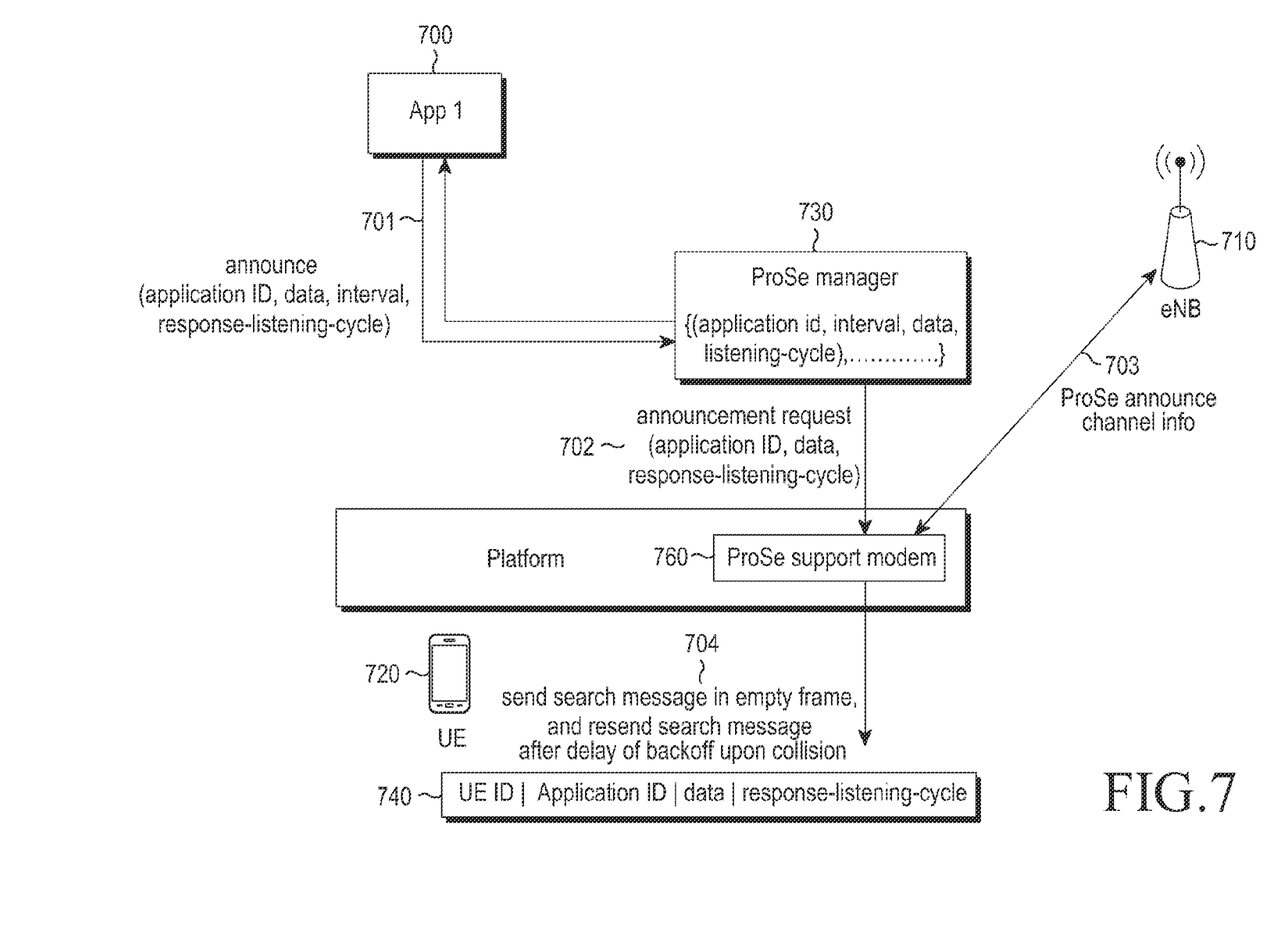
FIG. 7 is a communication diagram illustrating an example in which an application authorized to use a ProSe sends a search message in a communication system, according to an embodiment of the present invention.

FIG. 7 illustrates an example in which an application authorized to use a ProSe sends a search message in a communication system according to an embodiment of the present invention.

Referring to FIG. 7, a UE 720 includes a ProSe manager 730. An App1 700 installed in the UE 720 is a ProSe application authorized to use a ProSe.

At operation 701, the App1 700 requests a search operation by sending a search message including an application ID and application-related information to the ProSe manager 730. The application-related information may include, for example, data, interval-related information, response-listening-cycle related information, and the like. The ProSe manager 730 checks the information (e.g., application ID, information indicating whether the ProSe usage is authorized, validity time-related information, key-related information, allowed operator-related information and the like) stored through the authorization procedure at Step 2 and Step 3 in FIG. 6 and determines whether the application indicated by the application ID is authorized for the ProSe usage. If the application is an application that is not authorized for the ProSe usage, the ProSe manager 730 rejects the search operation requested in operation 701.

However, if the application is an application that is authorized for the ProSe usage, the ProSe manager 730 checks a configuration file for a related application ID in the information that the ProSe manager 730 has received from a connected ProSe server over an operator network in the authorization procedure at Step 2 and Step 3 in FIG. 6. The configuration file refers to service-related information in the information that is stored in the ProSe manager 610 at Step 606 in FIG. 6.

The ProSe manager 730 detects the number sending a search message, a cycle used for listening for a response, and configuration information for the entire time by checking the configuration file, and the ProSe manager 730 may send an announce request message including the detected information to a ProSe support modem 760 at operation 702.

At operation 703, the ProSe support modem 760 of the UE 720 obtains ProSe announce channel information by checking system information from an eNB 710. The system information may be stored in the UE 720 along with a sequence number. If a read sequence number is higher than the stored sequence number, the ProSe support modem 760 first reads the sequence number of the ProSe announce channel information broadcasted by the eNB 710 and then obtains the ProSe announce channel information by checking the system information.

The UE 720 repeatedly sends a search message 740 during a search time by increasing an interval step by step using the resources (e.g., empty frames) that other UEs do not use in the ProSe announce channel information obtained at operation 703. The search message 740 may include, for example, a UE ID, an application ID, data, response-listening-cycle related information, and the like. At operation 704, upon detecting collision during its sending of a search message, the UE 720 re-sends the search message after a lapse of a backoff time by applying a backoff delay. The sending of a search message may last during the search time and may be terminated upon expiration of the search time.

Figure 8:
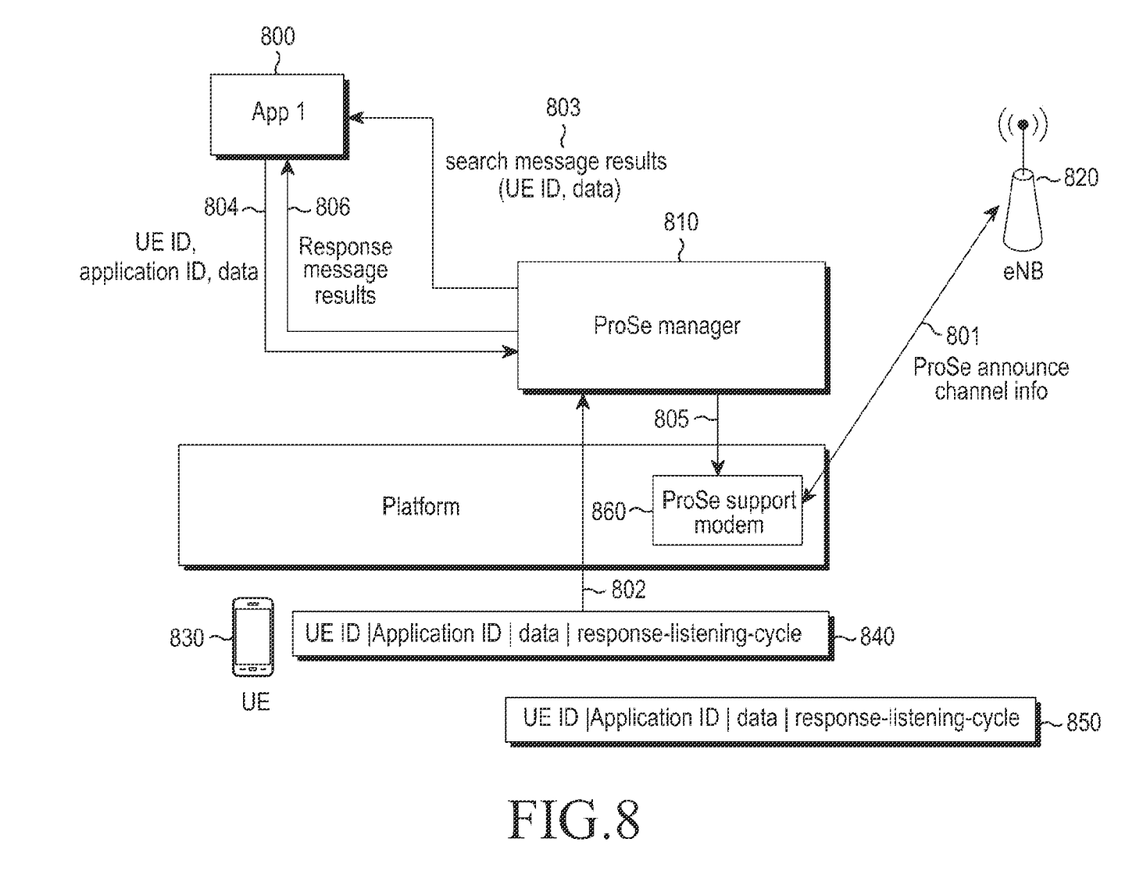
FIG. 8 is a communication diagram illustrating an example in which an application authorized to use a ProSe sends a response to a received search message in a communication system, according to an embodiment of the present invention.

FIG. 8 illustrates an example in which an application authorized to use a ProSe sends a response to a received search message in a communication system according to an embodiment of the present invention.

Referring to FIG. 8, a UE 830 includes a ProSe manager 810. An App1 800 installed in the UE 830 is a ProSe application authorized to use a ProSe.

At operation 801, a ProSe support modem 860 of the UE 830 obtains ProSe announce channel information by checking system information from an eNB 820. In other words, the UE 830 receives a search message 840 sent by another UE by monitoring the ProSe announce channel information and forwards the received search message 840 to the ProSe manager 810 at operation 802. The search message 840 may include, for example, a UE ID, an application ID, data, response-listening-cycle related information, and the like.

The ProSe manager 810 determines whether an application indicated by the application ID included in the search message 840 is an application that is authorized for the ProSe usage through the authorization procedure at Step 2 and Step 3 in FIG. 6, and the ProSe manager 810 also determines whether a listening operation is allowed, based on the service-related information in the information that is stored in the ProSe manager 610 at operation 606 in FIG. 6.

If it is determined that the indicated application is an application authorized for the ProSe usage and the listening operation is allowed, the ProSe manager 810 stores the UE ID, application ID, data, and response-listening-cycle in the information received at operation 802. At operation 803, the ProSe manager 810 starts a validity timer that counts a ProSe delivery time and then transmits the reception results of the search message, the UE ID and the data, to the App1 800 indicated by the application ID.

At operation 804, the App1 800 checks the data received at operation 803 and then transmits the UE ID, application ID and data to the ProSe manager 810 in response to the search message. The ProSe manager 810 determines whether the validity timer has expired, which started upon receipt of the search message 840. If the validity timer has not expired, the ProSe manager 810 determines whether the application indicated by the application ID received at operation 804 is authorized for the ProSe usage based on the information obtained in the authorization procedure at Step 2 and Step 3 in FIG. 6. If it is determined that the application is an application authorized for the ProSe usage, the ProSe manager 810 compares the UE ID and application ID obtained at operation 804 with the UE ID and application ID obtained at operation 802 to find the stored response-listening-cycle. The response-listening-cycle represents the time at which a UE that sent a search message or an advertisement message listens resources to receive a response message thereto. As an example, the UE 830 that sent a search message or an advertisement message may listen to a predetermined number of frames beginning at the resources corresponding to a discovery channel at the time indicated by the response-listening-cycle.

Thereafter, at operation 805, the ProSe manager 810 includes or inserts the UE ID for the UE 830 and the application ID and data received at operation 804 in a response message 850 to be sent; resets the response-listening-cycle indicating the time the UE 830 receives a message based on the response-listening-cycle information included in the response message 850; and then requests the ProSe support modem 860 to send the response message 850.

The UE 830 calculates the sending time of the response message 850 based on the ProSe announce channel information obtained at operation 801 and the response-listening-cycle information received through the search message 840, and the UE 830 sends the response message 850 at the calculated sending time. Upon receiving the search message 840, the UE 830 sends an Acknowledgement (ACK) message for the response message 850 based on the response-listening-cycle information included in the search message 840. At operation 806, the ProSe manager 810 notifies the App1 800 of the reception results of the received response message 850.

It can be appreciated that the method and apparatus for routing a message for a ProSe according to an embodiment of the present invention may be implemented in the form of hardware, software, or a combination thereof. Any such software may be stored in volatile or nonvolatile storage (e.g., erasable/re-writable Read Only Memory (ROM)), memory (e.g., Random Access Memory (RAM), memory chip, memory device, or memory Integrated Circuit (IC)), or optically/magnetically recordable machine (e.g., computer)-readable storage media (e.g., Compact Disk (CD), Digital Versatile Disk (DVD), magnetic disk, or magnetic tape). The proposed method may be implemented by a computer or a mobile terminal, which includes a controller and a memory. It can be noted that the memory is one example of machine-readable storage media suitable to store a program or programs including instructions for implementing embodiments of the present invention.

Therefore, the present invention may include a program including codes for implementing the apparatus or method as defined by the appended claims, and machine (or computer)-readable storage media storing the program. The program may be electronically carried by any media such as communication signals which are transmitted through wired/wireless connections.

The method and apparatus for routing a message for a ProSe by a UE according to an embodiment of the present invention may receive and store the program from a program server, to which the UE is connected by wires or wirelessly. The program server may include a memory for storing a program including instructions for performing the proposed method and storing information needed for the proposed method, a communication unit for performing wired/wireless communication with the UE, and a controller for transmitting the program to the UE automatically or at the request of the UE.

As is apparent from the foregoing description, the present invention may provide a method and apparatus for routing a ProSe message, thereby making it possible to provide diverse and systematic services.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method, by a first user equipment (UE), for a proximity-based service (ProSe) with a second UE in a wireless communication system, the method comprising:
    transmitting, to a node, a first message including a ProSe application identity (ID) for identifying an application installed in the first UE for a ProSe and a UE ID for identifying the first UE; and
    receiving, from the node, a second message including validity time in which the application for the ProSe is valid in response to the first message.

2. The method of claim 1, further comprising:
    exchanging a search message including information related to the application with the ProSe with the second UE.

3. The method of claim 2, wherein the search message includes at least one of the UE ID, response-listening-cycle information indicating a response message reception time for the search message, and data.

4. The method of claim 1, wherein the first message further includes at least one of an operator ID for identifying an operator that has assigned the ProSe application ID, version/timestamp information of a configuration file, and a signature of the operator used for checking integrity of the configuration file.

5. The method of claim 1, wherein the second message includes at least one of the ProSe application ID, information indicating whether the ProSe is authorized, key information to be used by an operator managing the node, information related to allowed operators, and set values for the allowed operators.

6. A method, by a node, for a proximity-based service (ProSe) in a wireless communication system, the method comprising:
    receiving, from a user equipment (UE), a first message including a ProSe application identity (ID) for identifying an application installed in the UE for a ProSe and a UE ID for identifying the UE; and
    transmitting, to the UE, a second message including validity time in which the application for the ProSe is valid in response to the first message.

7. The method of claim 6, wherein the first message further includes at least one of an operator ID for identifying an operator that has assigned the ProSe application ID, version/timestamp information of a configuration file, and a signature of the operator used for checking integrity of the configuration file.

8. The method of claim 6, wherein the second message further includes at least one of the ProSe application ID, information indicating whether the ProSe is authorized, key information to be used by an operator managing the server, information related to allowed operators, and set values for the allowed operators.

9. A user equipment (UE) for a Proximity-based Service (ProSe) with a second UE in a wireless communication system, the UE comprising:
  a transceiver configured to transmit and receive a signal; and
  a control unit configured to install an application, to transmit, to a node, a first message including a Prose application identity (ID) for identifying the application installed in the first UE for a ProSe and a UE ID for identifying the UE, and to receive, from the node, a second message including validity time in which the application for the ProSe is valid in response to the first message.

10. The UE of claim 9, wherein the control unit is configured to exchange a search message including information related to the application for the ProSe with the second UE.

11. The UE of claim 10, wherein the search message includes at least one of the UE ID, response-listening-cycle information indicating a response message reception time for the search message, and data.

12. The UE of claim 9, wherein the first further includes at least one of an operator ID for identifying an operator that has assigned the ProSe application ID, version/timestamp information of a configuration file, and a signature of the operator, used for checking integrity of the configuration file.

13. The UE of claim 9, wherein the second message further includes at least one of the ProSe application ID, information indicating whether the ProSe is authorized, key information to be used by an operator managing the server, information related to allowed operators, and set values for the allowed operators.

14. A server node for a proximity-based service (ProSe) in a wireless communication system, the node comprising:
  a transceiver configured to transmit and receive a signal; and
  a control unit configured to receive, from a user equipment (UE), a first message including a ProSe application identity (ID) for identifying an application installed in the UE for a ProSe and a UE ID for identifying the UE and to transmit, to the UE, a second message including validity time in which the application for the ProSe is valid in response to the first message.

15. The node of claim 14, wherein the first message further includes at least one of an operator ID for identifying an operator that has assigned the ProSe application ID, version/timestamp information of a configuration file, and a signature of the operator used for checking integrity of the configuration file.

16. The node of claim 14, wherein the second message further includes at least one of the application ID, information indicating whether the ProSe is authorized, key information to be used by an operator managing the server, information related to allowed operators, and set values for the operators.

* * * * *